United States Patent [19]

Rhoades et al.

[11] 4,364,516
[45] * Dec. 21, 1982

[54] INJECTOR

[75] Inventors: Edward J. Rhoades, Troy; Edwin C. Rosenberger, Piqua; Jerome A. Waker, Casstown, all of Ohio

[73] Assignee: Chem-Lawn Corporation, Columbus, Ohio

[ * ] Notice: The portion of the term of this patent subsequent to Feb. 16, 1999, has been disclaimed.

[21] Appl. No.: 166,513

[22] Filed: Jul. 7, 1980

Related U.S. Application Data

[63] Continuation-in-part of Ser. No. 112,883, Jan. 17, 1980, Pat. No. 4,315,600.

[51] Int. Cl.³ .............................................. B05B 7/28
[52] U.S. Cl. ...................................... 239/74; 141/24; 137/564.5; 137/893; 222/134; 239/124; 239/310; 239/323
[58] Field of Search .............................. 222/133-135, 222/209, 386.5; 137/564.5, 893; 239/74, 124, 127, 310, 315, 316, 318, 322, 323, 327, 373; 141/23-26

[56] References Cited

U.S. PATENT DOCUMENTS

| 2,199,151 | 4/1940 | Dailey et al. | 137/564.5 X |
| 2,618,510 | 11/1952 | Mills | 137/564.5 |
| 3,207,443 | 9/1965 | Gilmour | 239/318 X |
| 3,279,703 | 10/1966 | Steltz et al. | 239/318 X |
| 3,726,304 | 4/1973 | Cook | 137/564.5 X |
| 4,210,175 | 7/1980 | Daniels et al. | 137/564.5 |
| 4,315,600 | 2/1982 | Rhoades et al. | 239/74 |

FOREIGN PATENT DOCUMENTS 936956 9/1963 United Kingdom ............. 137/564.5

Primary Examiner—Andres Kashnikow
Attorney, Agent, or Firm—Biebel, French & Nauman

[57] ABSTRACT

An injector for injecting into a flow of a first liquid passing through a flow passage formed in the body of the injector a second liquid, which is pressurized for injection by the pressure of the first liquid. Pressurization of the second liquid is accomplished by means of a liquid-tight canister separated into first and second pressure chambers by a flexible diaphragm. The pressure of the first liquid flowing through the injector is tapped off to pressurize the first pressure chamber, and through the diaphragm, the second chamber containing the second liquid. The second chamber is connected to the flow passage at a point downstream of the point where the pressure of the first liquid is tapped off to pressurize the canister, and the passage is venturi-shaped adjacent the point at which the second liquid is injected into the flow passage to provide an additional force drawing the second liquid into the flow passage. A second embodiment of canister, which is nearly double the capacity of the first is disclosed, as well as a system for refilling the canisters.

20 Claims, 15 Drawing Figures

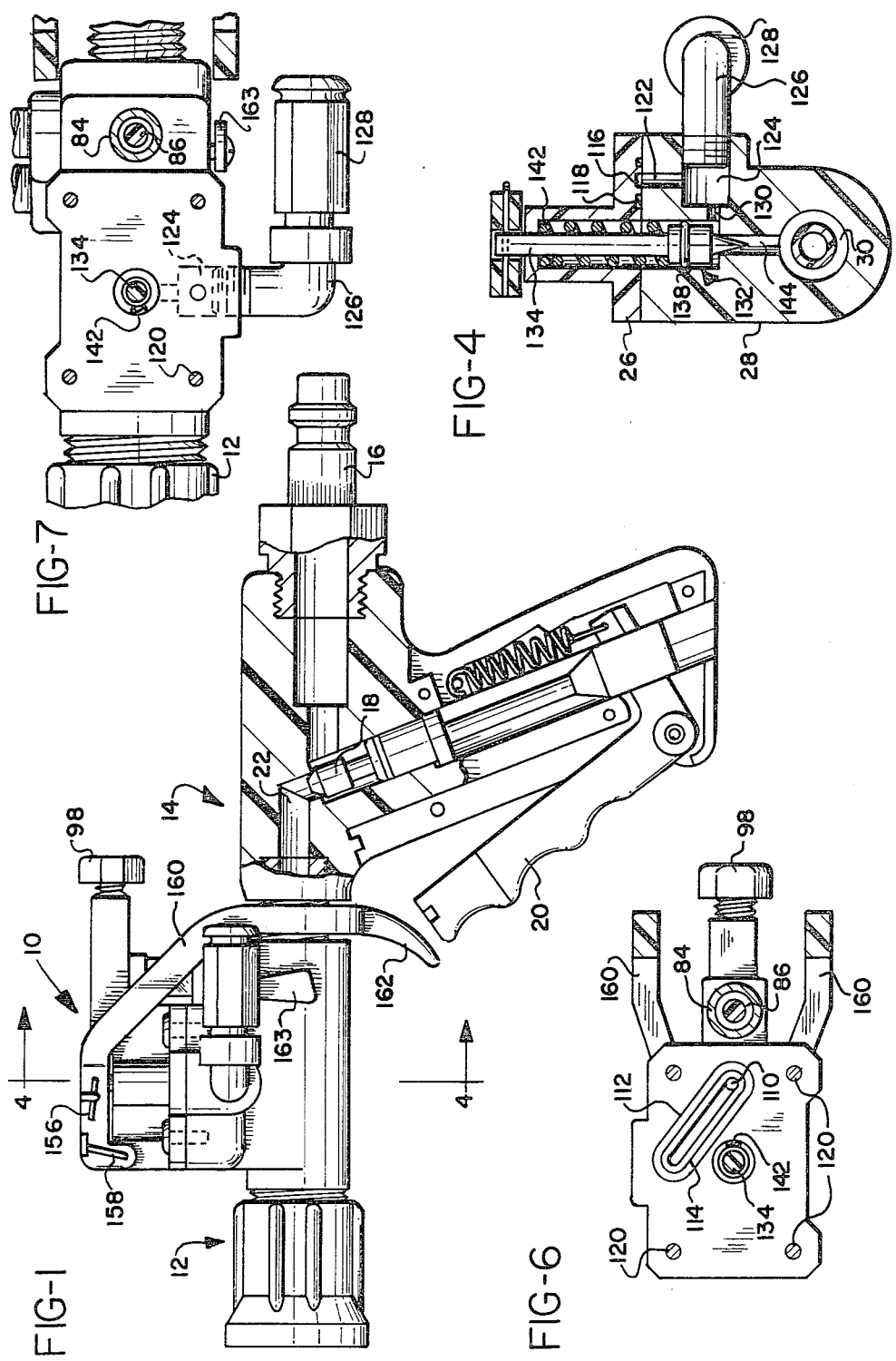

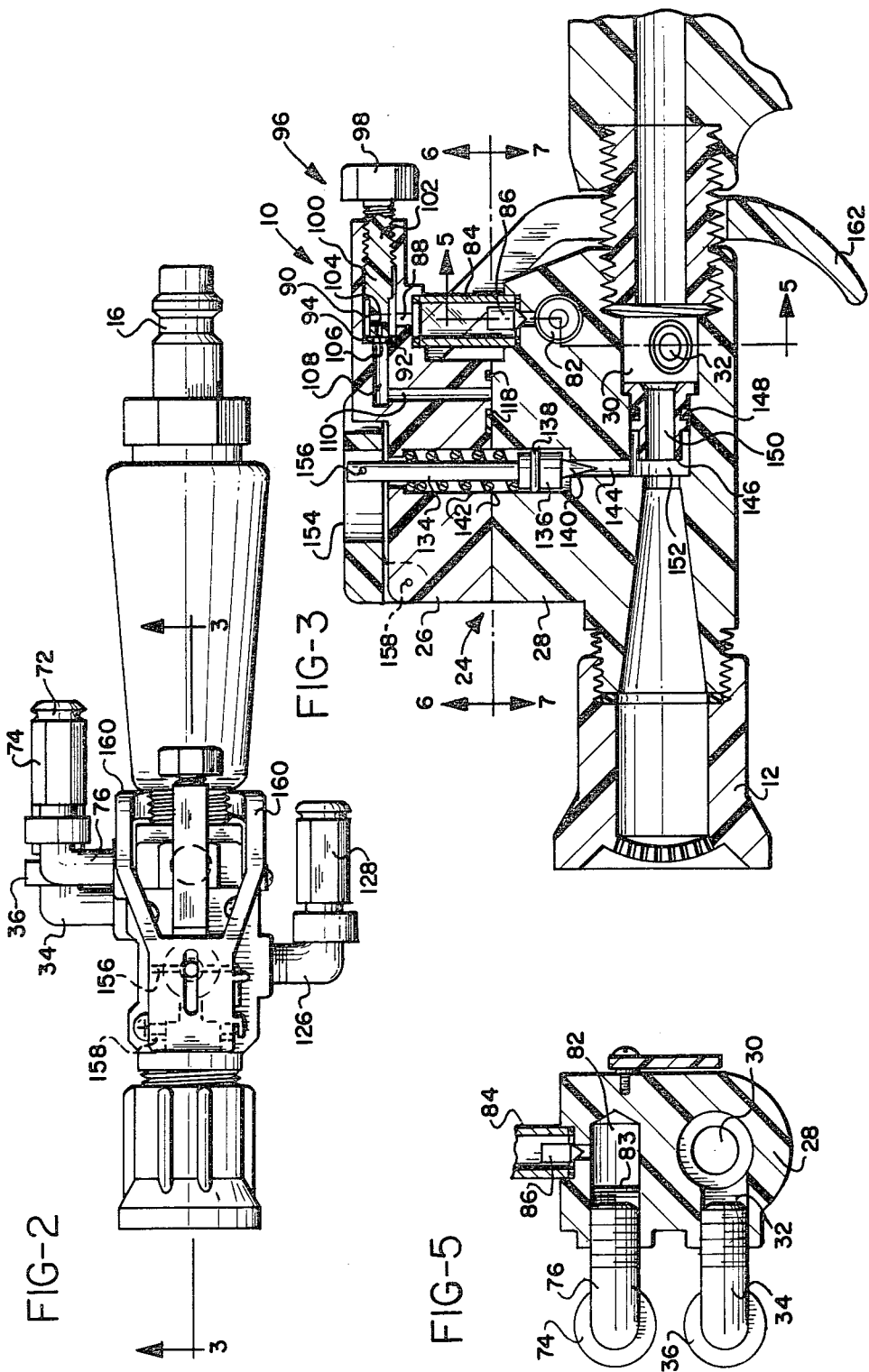

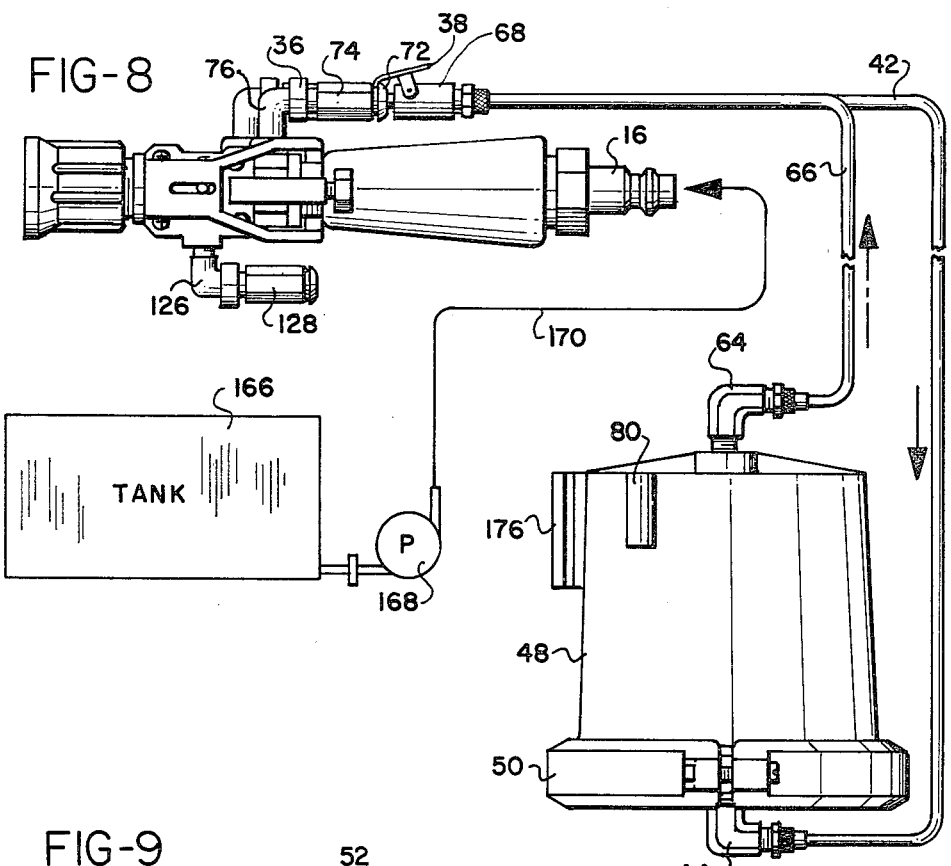
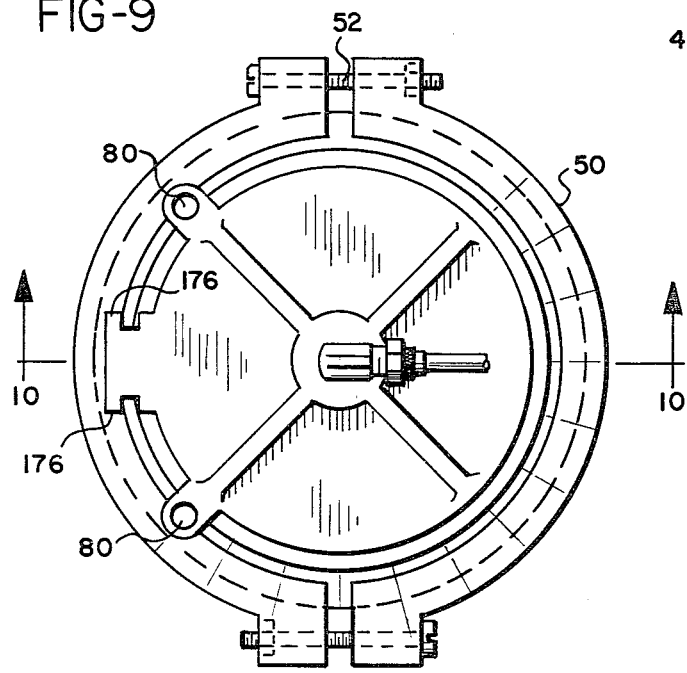

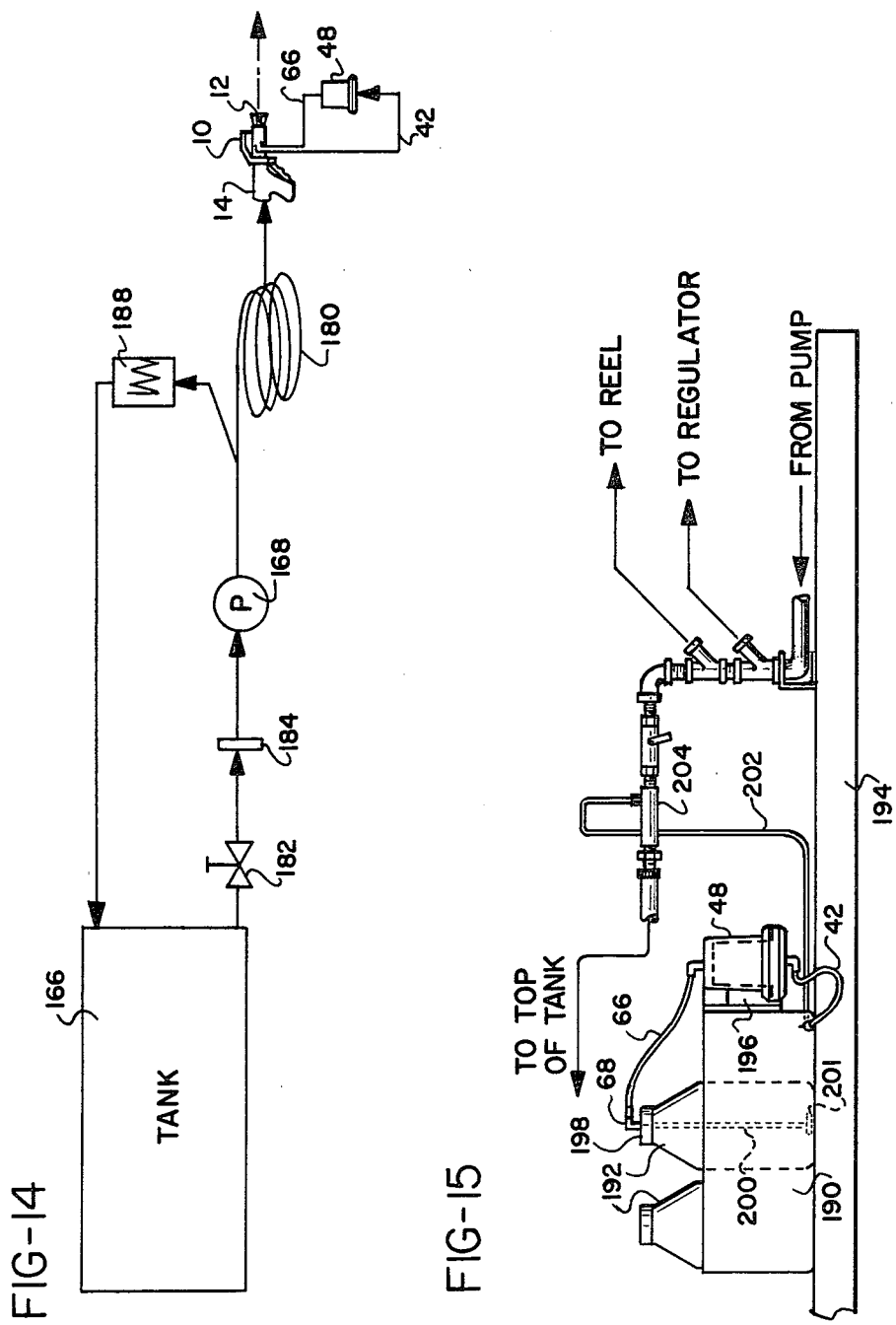

INJECTOR

CROSS REFERENCE TO RELATED APPLICATION

This application is a continuation-in-part of application Ser. No. 112,883, filed Jan. 17, 1980, for Spray Gun Injector now U.S. Pat. No. 4,315,600, issued Feb. 16, 1982.

BACKGROUND OF THE INVENTION

It is often desirable to be able to inject a liquid having certain characteristics into a flow of a second liquid having different characteristics. For example, in spraying water or fertilizer on a lawn it may be desirable to inject into the flow of water or fertilizer a second liquid, such as a herbicide or pesticide. Similarly, it may be desirable to inject a liquid detergent into a flow of water during a washing process.

Where the injection under pressure of one liquid into a flow of second liquid is desired, a separate pressurizing source for the injected liquid will usually be required.

SUMMARY OF THE INVENTION

The present invention provides an injector in which the pressure of a first liquid passing through the body of the injector is utilized to pressurize the injection of a second liquid into the flow of the first liquid.

Specifically, the injector of the present invention includes a main body portion having a passage formed through it for the flow of a first liquid into which it is desired to inject under pressure a second liquid, and a liquid tight canister having its interior divided into two, separate pressure chambers by a flexible diaphragm.

A first of the two pressure chambers is connected via a conduit to an opening communicating with the flow passage through the main body portion of the injector and the second pressure chamber, containing a supply of the second liquid, is connected via a conduit and a series of ports, to the flow passage, so that the second liquid is at a pressure substantially the same as the pressure of the first liquid.

Additionally, a portion of the flow passage through the main body portion adjacent the point at which the second liquid is injected into the flow passage is venturi-shaped to create a negative pressure at this point to facilitate the introduction of the second liquid into the flow through the flow passage.

In a preferred embodiment of the invention, the second liquid flows through a transparent sight gauge so that the operator can be certain that the second liquid is being injected as desired, and flow of the second liquid is controlled by a trigger actuated valve positioned in a port just upstream of the flow passage.

A metering valve is also included for regulating the flow of the second liquid through the ports interconnecting the second pressure chamber and the flow passage, and the ports communicate with a calibrating opening that permits the operator to draw off and determine the rate of flow of the second liquid through the injector.

The rate of flow of the first liquid through the flow passage of the main body portion can also be controlled through the use of removable orifice inserts which are fitted into the flow passage to provide a flow of the desired rate.

As noted above, the means for transmitting the pressure of the first liquid to the second liquid includes a canister having a diaphragm positioned within the canister. Preferably the canister is generally cylindrical in configuration and the diaphragm is also cylindrical in configuration and has a volume very close to that of the canister. In accordance with another preferred embodiment of the invention, two canisters can be interconnected to effectively nearly double the volume of the second liquid held within the canister by simply interconnecting two canisters adjacent their open ends by means of a pair of C-shaped clamp members.

The injector of the present invention is particularly adapted for injecting into a flow of fertilizer, herbicides, pesticides or similar materials, and the present invention, in accordance with an additional feature thereof incorporates a system for refilling the canister with the second liquid by using the pumping system for the first liquid.

Thus, the flow line through which the fertilizer flows is provided with a recirculating feature which permits the fertilizer to be withdrawn from and returned to a tank or similar supply source. Within the flow line is mounted a venturi-shaped section, and connected with the venturi-shaped section is a conduit connectable with the first pressure chamber of the canister, so that when fertilizer is circulated from and back into the tank it creates a negative pressure at the venturi-shaped portion of the flow line, causing fertilizer contained within the first pressure chamber of the canister to be withdrawn.

The second pressure chamber of the canister is connected to a source of herbicide, pesticide or other desired material, so that as the fertilizer is withdrawn from the first pressure chamber the herbicide, pesticide, etc. is withdrawn from its source into the second pressure chamber of the canister, filling it for further operations.

These and other features and advantages of the present invention will become more apparent from the following description.

BRIEF DESCRIPTION OF THE DRAWINGS

FIG. 1 is a side view of the injector of the present invention in combination with a spray nozzle that may be of a type presently commercially used, and a gun-type spray device modified from a spray device also presently in use, with portions of the spray gun broken away for clarity;

FIG. 2 is a top view of the apparatus of FIG. 1;

FIG. 3 is an enlarged sectional view taken on line 3—3 of FIG. 2;

FIG. 4 is an enlarged sectional view taken on line 4—4 of FIG. 1;

FIG. 5 is a sectional view taken on line 5—5 of FIG. 3;

FIG. 6 is a sectional view taken on line 6—6 of FIG. 3;

FIG. 7 is a sectional view taken on line 7—7 of FIG. 3;

FIG. 8 is a schematic view showing the apparatus of FIGS. 1 and 2 interconnected with a canister constructed in accordance with the present invention and a tank;

FIG. 9 is a top view of the canister shown in FIG. 8;

FIG. 14 is a schematic view showing pumping circuitry associated with the present invention; and FIG. 15 is a view showing apparatus for refilling a canister.

DESCRIPTION OF THE PREFERRED EMBODIMENTS

Figure 10:
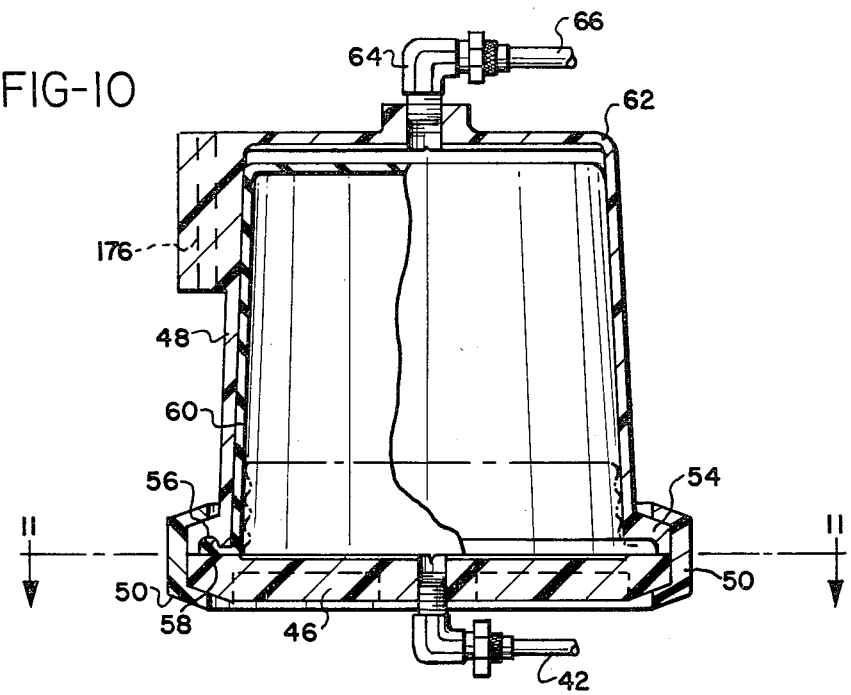
FIG. 10 is a cross-sectional view on line 10—10 of FIG. 9 with portions of the internally mounted diaphragm broken away.

While not so limited the injector of the present invention is shown for purposes of illustration as utilized in conjunction with a system for injecting a herbicide, pesticide or similar material into a flow of a fertilizer pumped from a tank truck or other source.

Thus, as seen in FIGS. 1 and 2 of the drawings, the injector 10 is provided with a spray nozzle 12, which may be of the type shown in U.S. Pat. No. Des. 238,671, issued Feb. 3, 1976, and a spray gun which may be a modified form of the gun shown in U.S. Pat. No. 4,083,497, issued Apr. 8, 1978. The valving and trigger arrangement of the modified gun 14 shown in FIGS. 1 and 2 may be identical to that shown in the above noted U.S. Pat. No. 4,083,497, and reference may be had to that patent for a complete description of the operation of the trigger actuated valve.

It will be sufficient for present purposes to indicate merely that a fitting 16 connected to the spray gun 14 at one end will also be attached to a source of fertilizer or other material pumped at some desired pressure, and that the valve 18 moves downwardly as seen in FIG. 1 of the drawings when the trigger 20 is pivoted clockwise to allow a first liquid under pressure to flow through the passageway 22.

As best seen in FIG. 3 of the drawings, the injector 10 includes main body portion 24 having upper and lower sections 26 and 28. The lower section 28, as also seen in FIGS. 4 and 5, has a flow passage 30 formed through it and an opening 32 communicating with the flow passage. A threaded elbow 34 is received in the opening 32 and is provided with a coupling 36 which receives a complementary coupling of the type shown, for example, at 68 in FIG. 8 of the drawings, which has a pivoted latch 38 to engage a lip on the coupling 36.

Figure 11:
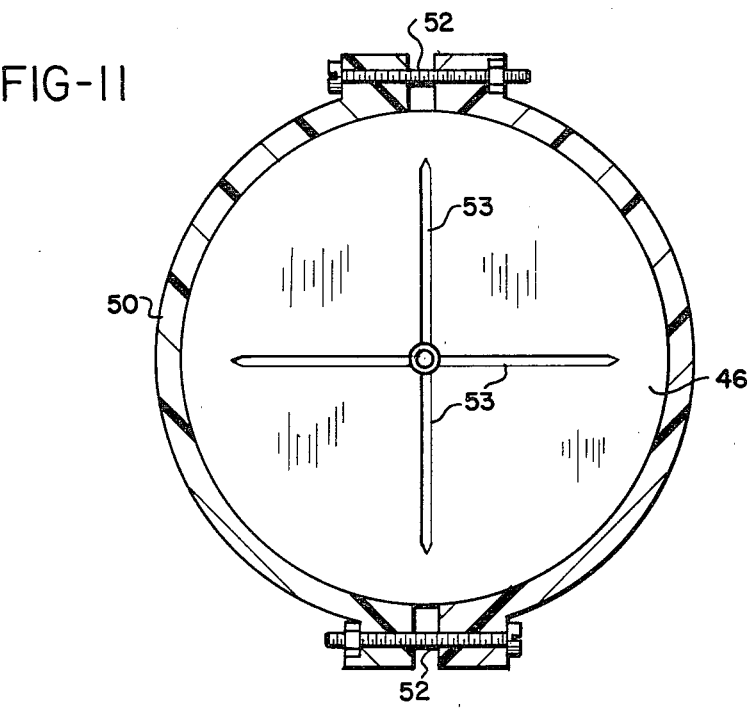
FIG. 11 is a sectional view taken on line 11—11 of FIG. 10.

The coupling received in coupling 36 is attached to a conduit 42, which at its opposite end is attached to a coupling 44 mounted on a cover 46 of a canister 48 (see also FIGS. 10 and 11 of the drawings). Cover 46 is retained in place by means of a pair of C-shaped coupling rings 50 clamped together by nut and bolt combinations 52, and an inner surface of the cover is provided with drainage grooves 53. A bottom flange 54 of the canister 48 is provided with a circumferential groove 56 which receives a bead 58 formed at the open end of the cylindrically shaped diaphragm 60. As can be best seen from FIG. 10 of the drawings, the diaphragm is of substantially the same volume as the volume of the canister 48 in the fully expanded configuration of the diaphragm 60.

Figure 13:
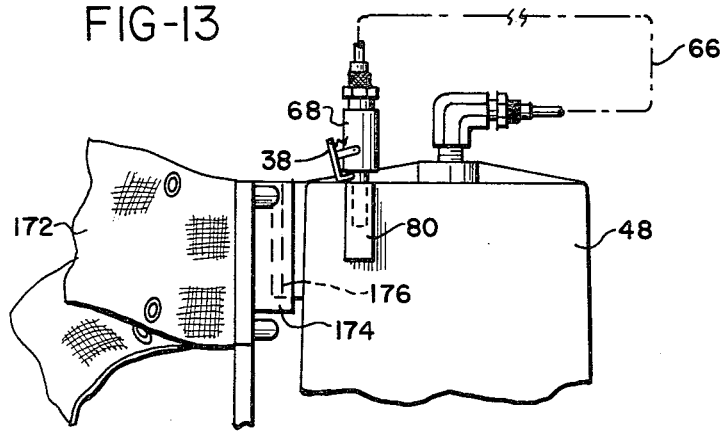
FIG. 13 is a partial view showing a canister attached to the belt of an operator.

The opposite, upper end 62 of the canister has an elbow fitting 64 attached to it and communicating with the interior of the canister, and attached to the fitting is a conduit 66 having, as seen in FIG. 8, a coupling 68 attached to its downstream end, which coupling is identical to the coupling received within the fitting 36, and includes a latch 38 engageable with a lip 72 on the coupling 74 mounted on the elbow 76. It will also be noted from FIGS. 8, 9 and 13 that the canister is provided with a pair of sockets 80 which, as shown in FIG. 13, provide storage for the couplings, such as the coupling 68, when the couplings at the ends of the lines 42 and 66 are disconnected from the couplings attached to the main body portion of the injector 10.

As seen in FIG. 5 of the drawings, the elbow 76 is threadably received in an opening 82 formed in the lower section of the main body portion at a point spaced from the flow passage 30. Preferably a one hundred mesh screen 83 is positioned in the opening 82 just downstream of the end of the elbow 76. The opening 82, which is also shown in FIG. 3 of the drawings, communicates with a transparent, cylindrical sight gauge 84, which contains an indicator 86 which will move upwardly in the sight gauge upon flow through the gauge. A short vertical port 88 communicates with the upper end of the sight gauge 84 and leads into a wider, horizontal port 90 having a shouldered portion 92 adjacent its downstream end which seats an O-ring 94.

A metering valve 96 includes a knob 98 and a shaft 100 having a threaded portion 102 received in a threaded opening in the upper section 26 of the injector. At its downstream end the shaft 100 bears against the O-ring 94 and has a transverse opening 104 formed through it communicating with an axial opening 106. Axial opening 106 also communicates with a short horizontal port 108, which in turn communicates with a vertical port 110.

The lower surface of the upper section 26, as best seen in FIG. 6 of the drawings, has a groove 112 formed in it surrounding a rib 114, which in turn surrounds a open channel 116. The groove 112 receives an O-ring 118, a portion of which is shown in cross-section in FIGS. 3 and 4 of the drawings. When the two sections 26 and 28 are secured together by screws or the like, 120, the open channel 116 forms a closed port from the vertical port 110 at one end of the channel 116 to a second vertical port 122 formed in the lower section 28, as best seen in FIG. 4 of the drawings.

Port 122 communicates with a calibration opening 124 which receives a threaded elbow 126 and coupling member 128, similar to the elbows 34 and 76 and the coupling member 74, respectively. A short horizontal port 130 leads to a larger vertical opening 132 formed in both the upper and lower sections 26 and 28.

Opening 132 receives a valve member including a stem 134, an enlarged portion 136 carrying an O-ring 138 and a lower, conically shaped portion 140. A coil spring 142 surrounds the shaft 134 and urges the conical portion 140 into engagement with a seat formed by the upper end of a vertical port 144. Port 144 communicates with the flow passage 30, as also seen in FIG. 3 of the drawings.

With continued reference to FIG. 3 of the drawings, it will be noted that the flow passage 30 also includes an orifice insert 146, which carries an O-ring 148 and is slidably received within a portion of the flow passage 30. The orifice insert 146 has a flow opening 150 through it designed to give a desired rate of flow through the flow passage, and ordinarily more than one orifice insert similar to orifice insert 146 will be provided to permit different flow rates to be achieved through the flow passage 30. It will also be noted from FIG. 3 of the drawings that adjacent to the port 144 the flow passage is provided with a venturi-shaped portion 152, which creates a negative pressure in this area.

A trigger 154 has pivotally attached to it, as at 156, an upper end of the stem 134, and the trigger is in turn pivotally attached, as at 158, to a portion of the upper section 26. The trigger 154 also includes, as seen in FIGS. 2 and 6, a pair of legs 160 which straddle a portion of the injector and join in a single, finger engageable portion 162 shown in FIGS. 1 and 3 of the drawings. A pivoted latch 163 can be used to engage a leg 160 and hold the trigger in the open position.

With the above construction it will be seen that with the diaphragm 60 in the canister 48 collapsed to approximately the position shown in phantom lines in FIG. 10 of the drawings and the upper portion of the canister filled with a liquid which it is desired to inject into the flow passage 30, the canister can be connected to the injector in the manner shown in FIG. 8 of the drawings. Thereafter, with the member 16 connected to a source of a first liquid, such as fertilizer contained in a tank or the like 166 and pumped by means of a pump 168 under pressure through a line 170, when the valve 18 shown in FIG. 1 of the drawings is opened, the first liquid under pressure will flow through the flow passage 30 (FIG. 3) in the lower section 28 of the main body section 24 of the injector 10.

If the trigger 154 is then moved counter clockwise as seen in FIGS. 1 and 3 of the drawings, the conical portion 140 will move upwardly, interconnecting the short vertical port 144 with the upper end of the interior of the canister 48 containing the second liquid to be injected into the flow passage, by means of the lower end of the opening 132, the short horizontal port 130, the calibration opening 124, the vertical port 122, the channel 116, the vertical port 110, the horizontal port 108, the axial opening 106 in the end of the metering valve 96, the transverse opening 104 in the valve 96, the short vertical port 88, the sight gauge 84, the opening 82, the elbow 76, the fitting 74, the line 66 and the fitting 64 attached to the top of the canister 48.

Since the pressure from the pump 168 is tapped off through the opening 32 and thence through the line 42 to the bottom of the canister 48, the second liquid contained within the upper portion of the canister will be pressurized to approximately the line pressure of the liquid flowing through the flow passage 30 by means of the flexible diaphragm 60, and thus the second liquid in the upper portion of the canister 48 will be injected into the flow passage 30 through the series of ports and openings listed above. The introduction of the second liquid into the flow passage 30 is enhanced by the venturi effect created by the venturi section 152 of the passage 30. Through the use of the metering valve 96, the rate of flow of the second liquid can be regulated as desired. As can be seen with reference to FIG. 3 of the drawings, as the metering valve is screwed inwardly into the upper section 26 the O-ring 94 is flattened against the shouldered portion 92 decreasing the open area into the short horizontal port 108.

In this regard the rate of flow of the second liquid can be calibrated by attaching a conduit having a coupling at one end similar to the coupling 68 attached to the line 66 to the coupling 128 communicating with the calibrating opening 124 shown in FIG. 4 of the drawings. With the first liquid flowing through the flow passage 30 the second liquid flowing through the calibration opening 124 can be collected in a graduated beaker and measured against time to determine the rate of flow of the second liquid and this rate of flow can be adjusted as desired by means of the metering valve 96. It should also be noted that the couplings 128, 74 and 36 are provided with spring loaded one-way check valves that prevent flow through them unless the complementary coupling elements, such as the coupling element 68 are received in them.

Figure 12:
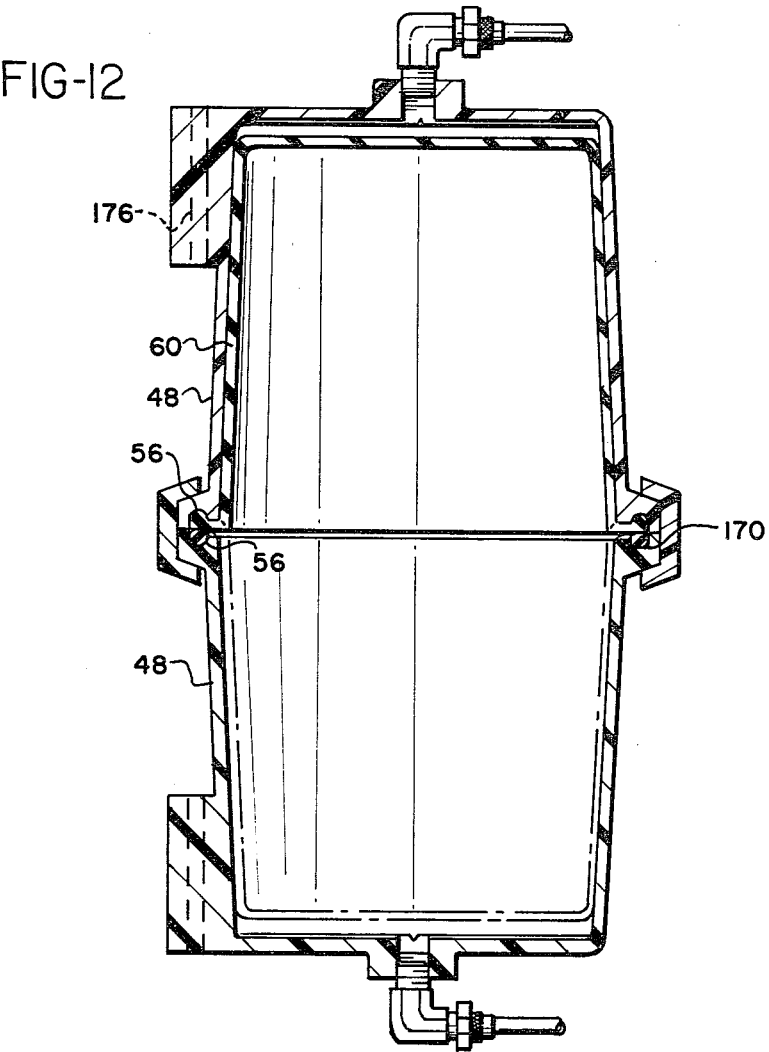
FIG. 12 is a cross-sectional view through a second preferred embodiment of canister showing an arrangement whereby the capacity of the canister can be nearly doubled.

The canister 48 shown in FIG. 10 of the drawings is capable of holding a certain quantity of the second liquid. In some instances it may be desired to increase the amount of such liquid held by the canister, and this can be done conveniently with the arrangement shown in FIG. 12 of the drawings. Thus, rather than securing a cover 46 on the lower end of the canister 48 the C-shaped clamps 50 are used to secure a second canister having its open end facing the lower open end of the upper canister. The diaphragm 60 is received in the upper canister in the same manner shown in FIG. 10 of the drawings, and to fill the groove 56 of the lower canister an O-ring 170 is seated in the groove 56 of the lower canister. As will be apparent from an inspection of FIG. 12, with this configuration the capacity of the canister is nearly doubled.

As illustrated in FIG. 13, a convenient manner of carrying the canister is to provide the operator with a belt 172 having a T-shaped bracket 174 to receive the outwardly projecting flanges 176, best seen in FIG. 9 of the drawings.

FIG. 14 of the drawings shows somewhat schematically hydraulic circuitry usable with the injector of the present invention. Again, the injector is shown for purposes of illustration as used in a spraying operation, such as a fertilizer spraying operation, where it will be desirable to occasionally apply a herbicide, pesticide or similar material to certain selected portions of the area being sprayed, although it will be apparent that the injector of the present invention finds use in a variety of other, different environments.

In FIG. 14 a tank 166 is shown connected to a reel of hose 180 through a valve 182, a screen 184 and a pump 168. A recirculating line is also provided including a regulator 188 which opens at some preset pressure to allow material to be circulated back into the tank 166. Thus, with the pump 168 operating, material will be withdrawn from the tank 166 and, with the valve 18 in the gun 14 opened, material from the tank will pass through the injector 10 and out through the nozzle 12. With the valve 18 closed material will simply recirculate back through the regulator 188 into the tank 166.

When it is desired to refill a canister 48 the arrangement shown in FIG. 15 of the drawings can be used. As seen in FIG. 15 a tray 190 containing one or more containers 192 of the second liquid can be mounted on a portion of the truck bed 194 or other supporting surface and carries a mounting bracket 196, which can be identical to the T-shaped bracket 174 shown in FIG. 13 of the drawings to receive the outwardly projecting flanges 176 of the canister 48. The upper end of the container 192 from which liquid is to be withdrawn can be provided with a cap 198 which includes a coupling identical to the couplings mounted on the injector to receive the coupling 68 attached to the conduit 66. The cap 198 also includes a hollow tube 200 which extends down into the bottom of the container and has a one hundred mesh screen 201 at its lower end. The conduit 42 extending from the bottom of the canister 48 has its coupling received in a complementary coupling mounted on the tray 190, and it in turn is connected to a line 202 connected to a venturi-shaped portion 204 in the liquid circulating line shown somewhat schematically in FIG. 15 of the drawings.

With this arrangement it will be seen that with the pump 168 operating, liquid is circulated from and back into the tank 166 and as it does so it creates a negative pressure at the venturi section 204, causing the first liquid contained in the canister 48 to be withdrawn from it and returned to the tank 166. As the first liquid is withdrawn from the canister 48 it causes the second liquid to be sucked from the container 192 into the top of the canister 48, filling it with the second liquid for subsequent use.

From the above it will be seen that the present invention provides an injector for injecting into a flow of first liquid passing through the injector body a second liquid using the pressure of the first liquid to pressurize the second liquid for injection, as well as a canister for containing a supply of the second liquid and means for refilling the canister as necessary.

While the forms of apparatus herein described constitute preferred embodiments of the invention, it is to be understood that the invention is not limited to these precise forms of apparatus, and that changes may be made therein without departing from the scope of the invention.

What is claimed is:

1. In combination with a spray gun including a handle and a muzzle and means for controlling the flow of a liquid through said muzzle, an injector comprising:
   a main body portion,
   a flow passage formed through said main body portion for accommodating the flow under pressure of a first liquid through said passage,
   means mounting said main body portion on said gun with said passage communicating with said muzzle whereby said flow of said first liquid through said passage is controlled by said spray gun flow controlling means,
   means for injecting a second liquid into said passage,
   means for transmitting said pressure of said first liquid to said second liquid to pressurize said second liquid for injection into said passage,
   valve means controlling injection of said second liquid into said passage,
   valve actuating means for selectively actuating said valve means,
   said spray gun flow controlling means and said valve actuating means being located adjacent each other and said handle and thereby simultaneously actuatable by a hand gripping said handle.

2. The injector of claim 1 wherein:
   said passage has a venturi-shaped portion, and
   said second liquid injecting means interconnects with said passage at said venturi-shaped portion thereof.

3. The combination of claim 1 wherein said pressure transmitting means includes:
   a pressure transmitting chamber,
   means interconnecting said pressure transmitting chamber and said passage at a first point along said passage, and
   means interconnecting said pressure transmitting chamber and said passage at a second point along said passage for the injection of said second liquid into said passage.

4. The injector of claim 3 wherein:
   said second point along said passage is downstream of said first point along said passage.

5. The injector of claim 4 wherein:
   said passage includes a venturi-shaped portion adjacent said second point therealong.

6. The injector of claim 3 further comprising:
   a transparent sight gauge communicating with said second point along said passage upstream thereof for indicating flow of said second liquid to said second point along said passage.

7. The injector of claim 3 wherein:
   said main body portion is provided with port means communicating with said second point along said passage through which said second liquid flows to said second point along said passage.

8. The injector of claim 7 further comprising:
   a metering valve for regulating the rate of flow through said port means.

9. The injector of claim 7 further comprising:
   calibrating means communicating with said port means upstream of said second point along said passage.

10. The injector of claim 1 further comprising:
    removable orifice means received in said passage for controlling the flow of said first liquid through said passage.

11. The combination of claim 1 wherein:
    said valve actuating means comprises trigger means pivotably mounted on said main body portion and attached to said valve means for actuation thereof.

12. The injector of claim 11 wherein:
    a portion of said trigger means straddles said main body portion.

13. The injector of claim 1 wherein:
    said main body portion comprises an upper section and a lower section.

14. The injector of claim 13 wherein:
    said passage is formed in said lower section, and
    said upper and lower sections are provided with interconnected port means in communication with said flow passage.

15. The injector of claim 1 wherein said pressure transmitting means comprises:
    a liquid tight canister of generally cylindrical configuration, and
    a generally cylindrical diaphragm received in said canister and dividing said canister into first and second pressure chambers.

16. The injector of claim 15 wherein:
    the volume of said diaphragm is substantially equal to the volume of said canister.

17. The injector of claim 15 wherein:
    the volume of said canister is at least twice as great as the volume of said diaphragm.

18. The injector of claim 15 further comprising:
    drainage grooves formed in an inner surface of said canister in said first chamber thereof.

19. An injector comprising:
    a main body portion having upper and lower sections,
    means defining a passage through said lower section of main body portion for the flow of a first fluid under pressure through said passage,
    means for interconnecting said passage with a source of said first liquid under pressure,
    a removable, cylindrically shaped orifice member received in said passage for controlling the flow therethrough, means defining a first opening through said lower section of said main body portion into said passage upstream of said orifice member, a liquid-tight canister having a flexible diaphragm mounted therein and dividing said canister into first and second pressure chambers, conduit means interconnecting said first opening and said first pressure chamber, means defining a second opening into said lower section of said main body portion at a point spaced from said passage, a second conduit interconnecting said second chamber and said second opening to permit the passage of a second liquid from said second pressure chamber into said second opening, first port means formed in said upper portion of said main body portion, a transparent sight gauge interposed between and interconnecting said second opening and said first port means for permitting observation of the flow of said second liquid therethrough, second liquid flow regulating means disposed in said first port means for regulating the flow of said second liquid therethrough, second port means formed in said lower section of said main body portion and communicating with said first port means in said upper section of said main body portion and said passage through said lower section of said main body section at a point downstream of said first opening, valve means controlling the flow of said second liquid through said second port means into said passage, said passage including a venturi-shaped portion for sucking said second liquid from said second port means into said passage, trigger means straddling said main body portion and interconnected to said valve means for controlling actuation of said valve means, latch means for engaging said trigger means and holding said valve in an open position thereof, and a calibration opening formed in said lower section of said main body portion in communication with said second port means.

20. In combination with a liquid-tight canister having a diaphragm separating said canister into first and second chambers, means for withdrawing a first liquid from said first chamber while filling said second chamber with a second liquid comprising:

a flow line connected at both ends with a supply of said first liquid, means for pumping said first liquid through said flow line, means defining a venturi-shaped section of said flow line opening downstream in the direction of flow through said flow line, conduit means interconnecting said first chamber of said canister and said venturi-shaped portion of said flow line, a supply of said second liquid, and a conduit means interconnecting said supply of said second liquid and said second chamber of said canister, whereby as said first liquid is pumped through said flow line said venturi portion thereof sucks said first liquid from said first chamber of said canister and causes said second liquid to flow from said source thereof into said second chamber of said canister.

* * * * *